United States Patent [19]
Ohta et al.

[11] Patent Number: 6,087,345
[45] Date of Patent: Jul. 11, 2000

[54] MATERIAL INHIBITING LIPID PEROXIDE-INCREASE

[75] Inventors: Atsutane Ohta; Masako Otsuki; Toshio Takizawa; Takashi Adachi, all of Saitama, Japan

[73] Assignee: Meiji Seika Kaisha, Ltd., Tokyo, Japan

[21] Appl. No.: 09/234,122

[22] Filed: Jan. 19, 1999

Related U.S. Application Data

[63] Continuation of application No. 08/973,146, Nov. 28, 1997.

[30] Foreign Application Priority Data

May 31, 1995 [JP] Japan .................................. 7-133466

[51] Int. Cl.$^7$ .................................................. A01N 43/78
[52] U.S. Cl. ........................... 514/54; 536/1.11; 536/4.1; 536/18.6; 536/123.1; 435/28
[58] Field of Search ................................. 536/123.1, 4.1, 536/1.11, 18.6, 55.1; 435/28; 514/54

[56] References Cited

U.S. PATENT DOCUMENTS

| | | | |
|---|---|---|---|
| 4,863,964 | 9/1989 | Hedlund et al. | 514/575 |
| 5,217,998 | 6/1993 | Hedlund et al. | 514/575 |
| 5,219,842 | 6/1993 | Okada et al. | 514/54 |
| 5,531,989 | 7/1996 | Paul | 424/93.4 |
| 5,744,134 | 4/1998 | Paul | 424/93.4 |

FOREIGN PATENT DOCUMENTS

| | | | |
|---|---|---|---|
| 56-154967 | 11/1981 | Japan | A23L 1/236 |
| 62-12791 | 1/1987 | Japan | C07H 15/256 |

OTHER PUBLICATIONS

Paller et al., *Kidney Int.*, vol. 34(4):474–480 (1988).
Paller et al., *Am J. Physio., Renal Fluid Electrolyte Physiol.*, vol. 255/3 (2413):F539–F544 (1988).
Ohta et al., *J. of Nutritional Science and Vitaminology*, vol. 41(3):281–91 (1995).
Ohta et al., *International Journal for Vitamin and Nutritional Research*, vol. 64(4):3416–323 (1994).

*Primary Examiner*—James O. Wilson
*Attorney, Agent, or Firm*—Sughrue, Mion, Zinn, Macpeak & Seas, PLLC

[57] ABSTRACT

A material inhibiting lipid peroxide-increase containing fructooligosaccharides is described which can conveniently provide at a low cost a food or drink product which exerts an excellent effect of inhibiting an increase in lipid peroxides without largely changing the daily dietary contents. The intake of the material inhibiting lipid peroxide-increase of the present invention can provide an excellent means for preventing various diseases (cancer, arterial sclerosis, etc.) caused by the formation of lipid peroxides, retarding aging, etc. Moreover, use of the material inhibiting lipid peroxide-increase of the present invention makes it possible to conveniently provide foods and drinks having excellent effects of inhibiting an increase in lipid peroxides at a low cost.

6 Claims, No Drawings

MATERIAL INHIBITING LIPID PEROXIDE-INCREASE

This is a continuation of application Ser. No. 08/973,146 filed Nov.28, 1997, the disclosure of which is incorporated herein by reference.

TECHNICAL FIELD

This invention relates to a material capable of inhibiting an increase in lipid peroxides. More particularly, it relates to a material inhibiting lipid peroxide-increase which contains fructooligosaccharides.

BACKGROUND ART

Most of living organisms including human beings maintain their vital activities by using oxygen. However, active oxygen in a living body has an intense toxicity. Recent studies have been clarifying that oxygen troubles closely relate to geriatric diseases such as carcinogenesis, ischemic diseases, diabetes, various cellular functional disorders due to the formation of lipid peroxides, aging, etc. In particular, unsaturated fatty acids constituting the brain and biomembranes are liable to be attacked by oxygen radicals and, as a result, the unsaturated fatty acids attacked form lipid peroxides via lipid peroxidation chain reactions. It is assumed that the formation of these lipid peroxides might relate not only to arterial sclerosis and liver diseases but also to carcinogenesis, aging, etc.

Under these circumstances, studies have been made on the screening of antioxidants contained in individual food, clarification of the function mechanisms, production methods, etc. from the viewpoint of the regulation of lipid peroxides in a living body. However, the clarification is still insufficient until now. From the viewpoint of diet to regulate the peroxidation of lipids, attention should be paid on the following points: (1) reduction of calory intake; (2) reduction of unsaturated fatty acid intake; (3) addition of tocopherol or synthetic antioxidants, etc. However, it is not always easy to change the dietary contents so as to satisfy these requirements.

Accordingly, it has been urgently desired to conveniently provide a food or drink product at a low cost which exerts an excellent effect of inhibiting an increase in lipid peroxides without largely changing the daily dietary contents.

DISCLOSURE OF THE INVENTION

The present inventors have conducted extensive studies in order to solve the above-mentioned problems. As a result, they have found for the first time that fructooligosaccharides have an excellent effect of inhibiting an increase in lipid peroxides. The present invention has been completed based on this finding.

Accordingly, the present invention provides a material inhibiting lipid peroxide-increase which comprises fructooligosaccharides.

Fructooligosaccharides is a mixture of saccharides wherein 1 to 3 fructose molecules are bonded to a fructose residue of sucrose. Because of having excellent physiological effects (promoting the growth of *Bifidobacterium bifidus* in the intestine, keeping a good intestinal condition, getting scarcely dental caries, etc.), fructooligosaccharides has attracted attention in the food industry as a novel functional food material.

The present inventors have investigated novel physiological effects of fructooligosaccharides. As a result, they have surprisingly found that fructooligosaccharides has an excellent effect of inhibiting an increase in lipid peroxides. There has been no report on the effect of fructooligosaccharides of inhibiting an increase in lipid peroxides. Namely, it is disclosed by the present invention for the first time.

The material inhibiting lipid peroxide-increase of the present invention may be in the form of fructooligosaccharides alone or in combination with an ordinary additive, and it may be given to a mammal including human beings, etc. in an arbitrary form such as granules, capsules, tablets, powders, solutions, etc. Needless to say, it may be added to foods, seasonings, food additives, etc. and thus taken. Many foods and drinks are usable therefor without specific restriction, so long as the material inhibiting lipid peroxide-increase of the present invention can be incorporated therein and the object of the present invention can be thus achieved. Although the addition level of the material inhibiting lipid peroxide-increase of the present invention is not particularly restricted, it may be added at a ratio of 50 wt % or less with, preferably from about 1 to 20 wt %, respect to fructooligosaccharides by taking the characteristics of the food or drink, preference, sweetness, economy, etc. into consideration. It may be added at an adequate step in the production process. The daily intake of the material inhibiting lipid peroxide-increase of the present invention is preferably 25 g or less, more preferably 1 to 10 g, with respect to fructooligosaccharides.

Since fructooligosaccharides is an indigestible sweetener, it is efficacious in reduction of calory intake too. Thus, fructooligosaccharides suits the above-mentioned object of the present invention also in this point. Accordingly, it is usable as a substitute or a partial substitute for sugar. Namely, a particularly remarkable effect can be achieved by using it as a domestic seasoning or for sweetening coffee or tea everyday.

BEST MODE FOR CARRYING OUT THE INVENTION

To further illustrate the present invention in greater detail, and not by way of limitation, the following Example will be given.

EXAMPLE 1

Male SD rats (Japan Clea Co.) aged 8 weeks were preliminarily fed with a solid feed MF (Oriental Yeast Co., Ltd.) for 3 days. On the basis of the body weight on the day 4, these rats were divided into 2 groups each having 4 animals. A test feed free from fructooligosaccharides was given to one group (Cont. group), while another test feed containing 5 wt % of Meioligo P® (manufactured by Meiji Seika Kaisha, Ltd., fructooligosaccharides purity>95 wt %) was given to another group (FO5 group) each for 14 days. Table 1 shows the compositions of these test feeds.

TABLE 1

| Component (%) | Cont. | FO5 |
| --- | --- | --- |
| α-corn starch | 49.5 | 49.5 |
| cellulose powder | 5.0 | 5.0 |
| mineral mixture | 3.5 | 3.5 |
| vitamin mixture | 1.0 | 1.0 |
| granulated sugar | 10.0 | 5.0 |
| corn oil | 6.0 | 6.0 |
| milk casein | 25.0 | 25.0 |
| Meioligo P ® | 0.0 | 5.0 |

Mineral mixture: AIN-76 blend.

Vitamin mixture: AIN-76 vitamin mixture.

The animals were fed in a room at a temperature of 22 ±2° C. under illuminating for 12 hours (8:00 to 20:00) per day. The animals were allowed to take the feed and drink water (distilled water) ad libitum. At the termination of the test, an abdominal operation was performed under ether anesthesia and the whole blood was collected from the lateral abdominal large vein. By using the blood thus collected, the blood lipid peroxide level was measured with the use of Lipid Peroxide-Test Wako (manufactured by Wako Pure Chemical Industries, Ltd.). As the results listed in Table 2 show, the intake of the material inhibiting lipid peroxide-increase of the present invention caused a significantly lower blood lipid peroxide level in the FO5 group.

TABLE 2

| Test group | Blood lipid peroxide level (mol/ml) |
|---|---|
| Cont. | 4.339 ± 0.252 |
| FO5 | 2,831 ± 0.517* |

(*$p < 0.01$)

Industrial Applicability

The intake of the material inhibiting lipid peroxide-increase of the present invention can provide an excellent means for preventing various diseases such as cancer and arterial sclerosis caused by the formation of lipid peroxides, retarding aging, etc. Moreover, use of the material inhibiting lipid peroxide-increase of the present invention makes it possible to conveniently provide foods and drinks having excellent effects of inhibiting an increase in lipid peroxides at a low cost, which makes the present invention highly meaningful.

We claim:

1. A method of inhibiting lipid peroxide-increase which comprises administering to a human or animal for which a lipid peroxide-increase inhibition is desired, a physiologically lipid peroxide-inhibiting effective amount of fructooligosaccharides.

2. The method according to claim 1, which comprises administering to said human or other animal for which inhibition of lipid peroxide-increase is desired, said physiologically effective amount of fructooligosaccharides, together with a pharmaceutically acceptable carrier.

3. The method according to claim 2, wherein said physiologically effective amount of frictooligosaccharides is incorporated in a food or drink.

4. The method according to claim 3, wherein said physiologically effective amount of fructooligosaccharides is added at a ratio of 1 to 50 wt % of the total material of said food or drink.

5. The method according to claim 4, wherein said ratio is 1–20 wt %.

6. The method according to claim 1, wherein the lipid peroxide-increase inhibition occurs in blood.

* * * * *